United States Patent [19]
Carlson et al.

[11] Patent Number: 5,871,159
[45] Date of Patent: Feb. 16, 1999

[54] FIBER MIXTURES FOR BRAKE PADS

[75] Inventors: Robert A. Carlson, Lake Forest; John L. Headley, Libertyville, both of Ill.

[73] Assignee: American Metal Fibers, Inc., Lake Bluff, Ill.

[21] Appl. No.: 844,411

[22] Filed: Apr. 18, 1997

[51] Int. Cl.$^6$ ................................................ B02C 19/12
[52] U.S. Cl. ............................... 241/4; 241/25; 241/30; 241/101.8; 366/348
[58] Field of Search .......................... 241/101.8, 4, 25, 241/30; 366/348; 188/73.1

[56] References Cited

U.S. PATENT DOCUMENTS 4,953,135  8/1990  Lee .
5,538,104  7/1996  Katz et al. ............................. 188/73.1
5,641,444  6/1997  Fujikawa et al. .

*Primary Examiner*—Mark Rosenbaum
*Attorney, Agent, or Firm*—Dorn, McEachran, Jambor & Keating

[57] ABSTRACT

A method and product to replace asbestos in brake pads and other molded friction materials. Conductive fibers and non-conductive fibers, both of small diameter and an average length less than two inches (5 cm), are mixed together in predetermined ratio to facilitate uniform suspension of friction materials in a moldable mixture. Steel, copper, or brass are preferred for the conductive fibers; aramid and acrylic resins are preferred for the non-conductive fibers.

14 Claims, 1 Drawing Sheet

FIBER MIXTURES FOR BRAKE PADS

BACKGROUND OF THE INVENTION

In the production of molded brake pads and other similar friction materials it was long customary to utilize granular or fibrous asbestos together with a combination of many different friction ingredients. Different combinations of ingredients in different ratios were employed to produce desired characteristics of heat resistance, friction, wear, and strength. However, asbestos is no longer favored as a component in brake pads due to its carcinogenic properties.

In the manufacture of molded brake pads that do not include asbestos, it is usually necessary to provide a combination of many more ingredients in order to obtain necessary properties in the finished product. That is, the mixtures of ingredients containing asbestos were generally simpler with respect to the number of different ingredients required. The ability of asbestos to assist in formation of a homogenous mix for ease of processing into molded brake pads was substantial.

To aid in the preparation of a mixture of raw materials having different densities, particle size and particle shape, for an asbestos-free brake pad, some manufacturers of different friction materials have used aramid fibers in pulp form. Such fibers have included the KEVLAR product of E. I. DuPont de Nemours & Co. and the TWARON product of a Netherlands company, Akzo Nobel. These aramid fiber pulps have been used in various friction materials. The pulp acts much like asbestos fiber in maintaining uniformity of the mix during processing of a molded brake pad. Other manufacturers of asbestos-free molded brake pads have employed acrylic resin pulp or mineral wool to assist in holding the mix together for processing. Reclaimed or reprocessed aramid materials have frequently been used.

The use of aramid or acrylic resin fibers, however, presents a major problem with respect to holding the complex ingredients of a brake pad together in a homogenous mixture prior to final molding of the brake pad. The aramid and acrylic fibers tend to acquire a static charge that causes them to cling to the walls of a mixer. This presents a substantial difficulty in obtaining and maintaining a homogenous final mix for the brake pad. Further, if a volatile solvent is employed, as in some liquid or semi-liquid mixtures, the static charge on the aramid or acrylic resin fibers may present a potential explosion hazard.

SUMMARY OF THE INVENTION

It is a principal object of the invention, therefor, to provide a new and improved asbestos-free mixture of aramid or acrylic resin fibers for use in the manufacture of brake pads that effectively eliminates the aforementioned difficulties pertaining to those materials in the manufacture of brake pads.

A related object of the invention is to provide new and improved methods of manufacture of a static-free mixture of aramid resin pulp or acrylic resin pulp or a mineral fiber pulp for use in the manufacture of brake pads and other friction materials.

Accordingly, in one embodiment the invention relates to a method of manufacturing a moldable brake pad mixture comprising the following steps:

A. providing a predetermined quantity of short conductive fibers of small diameter, the conductive fibers having an average length no greater than about one inch (25 mm);

B. providing a quantity of short, non-conductive fibers of small diameter, the non-conductive fibers having an average length no greater than about 0.5 inch (12.5 mm);

C. mixing the conductive fibers of step A with the nonconductive fibers of step B in predetermined ratio to provide a preliminary mixture;

D. providing a quantity of each of a plurality of different granular friction materials for a brake pad; and E. mixing the preliminary mixture of step C in predetermined ratio with the granular friction materials of step D to form a moldable brake pad mixture.

In another aspect the invention relates to a method of preparing a preliminary mixture for use in molding a brake pad, comprising the following steps:

J. providing a supply of short conductive fibers, the conductive fibers each having a small diameter and the conductive fibers having an average length no greater than about one inch (25 mm);

K. providing a supply of short non-conductive fibers, the non-conductive fibers each having a small diameter and the non-conductive fibers having an average length no greater than about 0.5 inch (12.5 mm); and L. mixing the conductive fibers of step J and the non-conductive fibers of step K together, in predetermined ratio, to afford a moldable premix for use in manufacture of a brake pad.

In yet another aspect the invention relates to a preliminary mixture for the manufacture of brake pads comprising a quantity of short conductive fibers of small diameter, having an average length no greater than about one inch (25 mm), uniformly intermixed in predetermined ratio with a quantity of short non-conductive fibers of small diameter having an average length no greater than about 0.5 inch (12.5 mm).

BRIEF DESCRIPTION OF THE DRAWING

The drawing consists of a schematic representation of a process of the present invention for preparation of a homogenous mixture of ingredients for use in the manufacture of brake pads or other friction materials.

DESCRIPTION OF THE PREFERRED EMBODIMENTS

Figure 1:
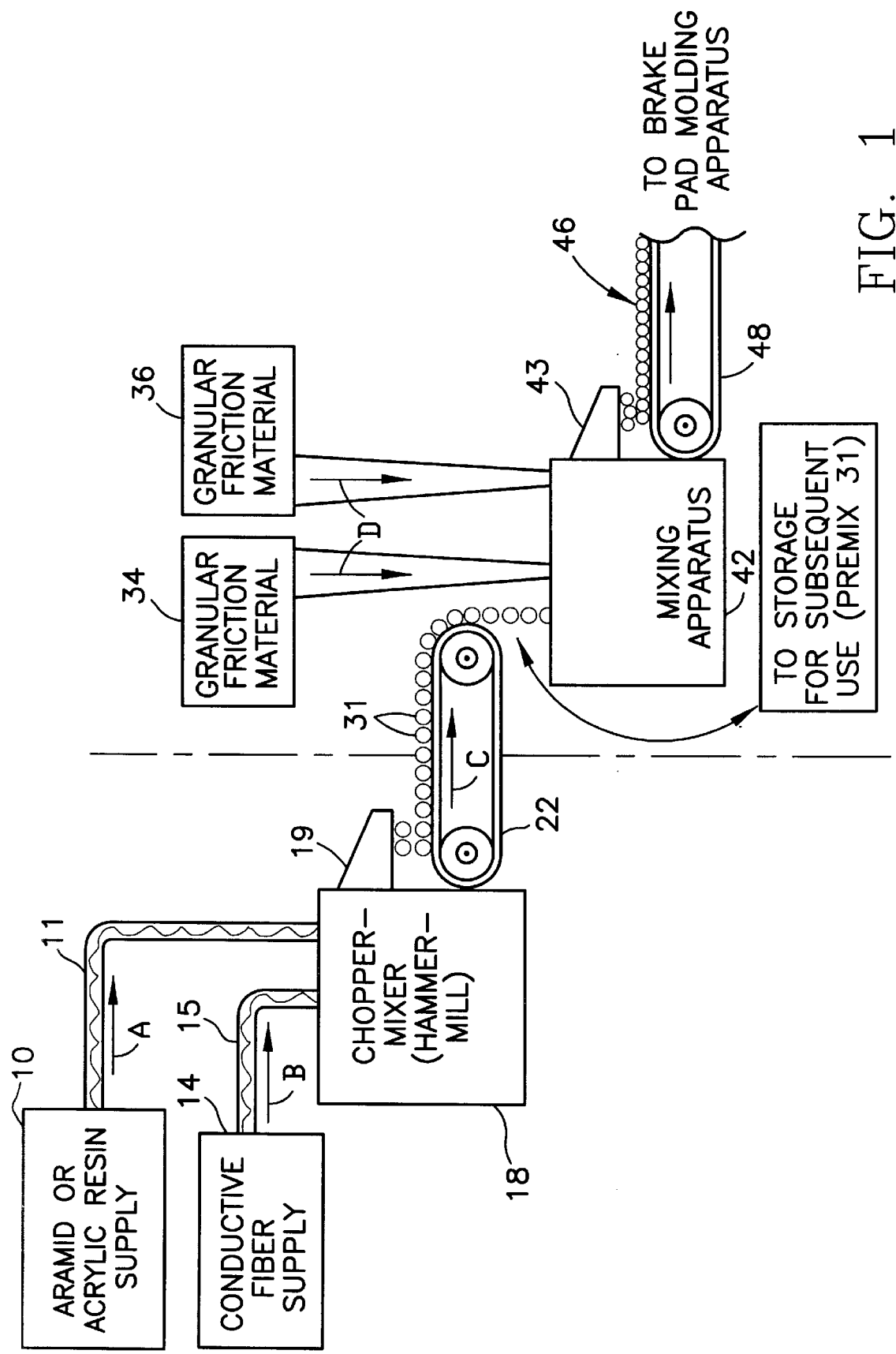

All embodiments of the present invention utilize a uniform and substantially homogenous mixture of non-conductive fibers with conductive fibers. The non-conductive fibers may be formed of aramid resin, acrylic resin, or even mineral wool. The conductive fibers may be formed of steel, copper, or brass, or may be formed of carbon other than graphite. The conductive fibers have a small diameter, less than 0.05 inch (1.2 mm), and should have an average length of less than one inch (25 mm). The non-conductive fibers also have a small diameter, and should have an average length of less than 0.5 inch (12.5 mm). The fiber length need not be uniform and may vary to a substantial extent. Aramid and acrylic fibers are preferred for the non-conductive fibers.

The term "brake pad", as used herein, refers to and includes brake linings, brake blocks, brake shoes and other forms of molded friction elements for brakes. Friction materials included in the final mixture may include granular phenolic resin, friction particles made from cashew nut oil, natural or synthetic rubber in granular form, mineral particles such as calcium carbonate, clay, fiberglass, wollastonite, barytes, magnesium oxide, mineral wool, and other ingredients selected by the brake pad manufacturer.

The drawing illustrates one method of preparing a preliminary mixture and a final mixture of granular and fibrous materials for use in molding brake pads. A supply 10 of non-conductive fibers, preferably of aramid or acrylic resin, producing an output mass or strip 11, is fed into a chopper-mixer apparatus 18. By way of example, apparatus 18 may comprise a conventional hammer mill. The system shown in the drawing also includes a supply 14 of conductive fibers' supply 14 may comprise a conventional machine for manufacturing steel wool or other metal fiber wool. The output of the conductive fiber supply 14 is a continuous strip 15 of interleaved metal fibers of indeterminate length that is also fed into the chopper-mixer 18. The directions of movement of the metal fiber strip 15 and the resin fiber supply 11 are indicated in the drawing by the arrows A and B, respectively.

In the chopper-mixer 18, the conductive metal fiber strip 15 is comminuted to produce a quantity of short conductive fibers of small diameter. These conductive fibers should have an average length no greater than about one inch (25 mm); they may be, and usually are, appreciably shorter. The chopper-mixer 18 also comminutes the non-conductive fiber material 11 to produce a quantity of short non-conductive fibers of small diameter. Like the conductive fibers, these non-conductive fibers have an average length no greater than about 0.5 inch (12.5 mm). For the non-conductive fibers, a preferred average length is no more than about 0.15 inch (0.374 mm). There is no requirement for uniformity of length. The two types of fiber are supplied to the chopper-mixer 18 in a predetermined ratio so that the preliminary mixture 31 constituting the output 19 from chopper-mixer 18 maintains the two kinds of fiber in that ratio.

As shown in the drawing, the preliminary mixture 31 from the output 19 of chopper-mixer 18 may be supplied to one input of a mixing apparatus 42 by means of a conveyor 22 or other appropriate means. On the other hand, the preliminary mixture (premix) 31 may be packaged or stored for subsequent use in the manufacture of brake pads or other products.

Mixing apparatus 42 has two additional inputs to which granular friction materials for a brake pad are supplied from two different supplies 34 and 36. The granular friction materials need not be of uniform size; substantial variation is permissible. The arrangement illustrated in the drawing employs two different granular friction materials; there may be additional granular friction material supplies, with outputs to mixer 42. In the mixing apparatus 42 the friction ingredients are mixed with the preliminary mixture 31 from device 18 to form a moldable brake pad mixture 46 that is supplied by appropriate means, such as a conveyor 48, to suitable brake pad molding apparatus. Because the present invention is not concerned with the final molding process for the brake pads, no molding apparatus has been illustrated.

In the illustrated process, mixing apparatus 42 can accept premix 31 and other ingredients in a single load or in a preselected sequence, with mixing time between sequences. The blend or premix 31 of conductive and non-conductive fibers can be added at any desired time appropriate for the final mix. Indeed, the process steps performed by mixing apparatus 42, friction ingredient supplies such as 34 and 36, etc. may occur at a completely different location from the preliminary steps afforded by supplies 10 and 14 and the chopper-mixer 18, or their equivalents.

In the process shown specifically in the drawing, the strip 15 of intertwined conductive fibers of indeterminate length is chopped in the chopper-mixer 18 to produce the desired multiplicity of short conductive fibers having an average length no greater than about one inch (25 mm), or preferably much shorter, schematically indicated at 31. Similarly, the mass 11 of intertwined non-conductive fibers 11, which again may have indeterminate lengths, is chopped to produce a multiplicity of short non-conductive fibers having an average length no greater than about 0.5 inch (12.5 mm) or shorter. Accordingly, the output 31 from chopper-mixer 18 includes both conductive and non-conductive fibers in a uniform mixture, of predetermined ratio. This mixture does not hold a static charge and does not tend to cling to the inner walls of the mixing apparatus; accordingly, in the mixing apparatus 42 the preliminary mixture can be readily and uniformly mixed with the granular ingredients from supplies such as 34 and 36. As a consequence, the material 46 supplied to the brake pad molding apparatus does not tend to separate according to its components and is appropriate for molding of brake pads.

It will be recognized that the drawing is a simplified illustration of a suitable process for preparing a brake pad molding mixture. To meet the requirements of brake pad manufacturers, the ratios of the conductive and non-conductive fibers and the other granular friction components requires control. This control can be afforded by conventional means, such as weighing or metering of the outputs from the granular friction material supplies 34 and 36. Of course, weighing or metering can be utilized for control of the rates of input to the chopper-mixer 18 from the fiber supplies 10 and 14. Because such control apparatus is susceptible of many forms and is well known in the art, no metering or other ratio controls have been shown in the drawing.

We claim:

1. A method of manufacturing a moldable brake pad mixture comprising the following steps:

A. providing a predetermined quantity of short conductive fibers of small diameter, the conductive fibers having an average length no greater than about one inch;

B. providing a quantity of short, non-conductive, non-asbestos fibers of small diameter, the non-conductive fibers having an average length no greater than about 0.5 inch (12.5 mm);

C. mixing the conductive fibers of step A with the non-conductive fibers of step B in predetermined ratio to provide a preliminary mixture;

D. providing a quantity of each of a plurality of different granular friction ingredients for a brake pad; and E. mixing the preliminary mixture of step C in predetermined ratio with the granular friction ingredients of step D to form a moldable brake pad mixture.

2. A method of manufacturing a moldable brake pad mixture, according to claim 1, in which step A comprises the following sub-steps:

A1. providing a strip of intertwined conductive fibers of indeterminate length; and A2. chopping the strip of sub-step A1 to produce a multiplicity of short conductive fibers having an average length no greater than about 0.25 inch.

3. A method of manufacturing a moldable brake pad mixture, according to claim 1, in which step B comprises the following sub-steps:

B1. providing a mass of intertwined non-conductive, non-asbestos fibers of indeterminate length; and B2. chopping the mass of sub-step B1 to produce a multiplicity of short non-conductive fibers having an average length no greater than about 0.25 inch.

4. A method of manufacturing a moldable brake pad mixture, according to claim 2, in which step B comprises the following sub-steps:

B1. providing a mass of intertwined non-conductive, non-asbestos fibers of indeterminate length; and B2. chopping the mass of sub-step B1 to produce a multiplicity of short non-conductive fibers having an average length no greater than about 0.25 inch.

5. A method of manufacturing a moldable brake pad mixture, according to claim 2, in which steps A2 and C are carried out simultaneously in a combined chopper-mixer apparatus.

6. A method of manufacturing a moldable brake pad mixture, according to claim 2, in which the strip of intertwined conductive fibers of step A1 constitutes the output of a conventional metal wool machine.

7. A method of preparing a preliminary mixture for use in molding a brake pad, comprising the following steps:

J. providing a supply of short conductive fibers, the conductive fibers each having a small diameter and the conductive fibers having an average length no greater than about one inch;

K. providing a supply of short non-conductive, non-asbestos fibers, the non-conductive fibers each having a small diameter and the non-conductive fibers having an average length no greater than about 0.5 inch; and L. mixing the conductive fibers of step J, and the non-conductive fibers of step K, together, in predetermined ratio, to afford a moldable mixture for a brake pad.

8. A method according to claim 7 in which step J comprises the following sub-steps:

J1. providing a strip of intertwined conductive fibers of indeterminate length and small diameter; and J2. chopping the strip of step J1 to produce short conductive fibers having an average length no greater than about 0.5 inch.

9. A method according to claim 8 in which step K comprises the following sub-steps:

K1. providing a strip of intertwined non-conductive, non-asbestos fibers of small diameter and indeterminate length; and K2. chopping the strip of step K1 to produce short non-conductive fibers having an average length no greater than about 0.25 inch.

10. A method according to claim 8 in which the conductive fibers of step J1 are metal fibers.

11. A method according to claim 8 in which the conductive fibers of step J1 are non-metallic fibers.

12. A method according to claim 7 in which the non-conductive fibers of step K are formed of an aramid resin.

13. A method according to claim 7 in which the non-conductive fibers of step K are formed of an acrylic resin.

14. A method according to claim 7 in which the non-conductive fibers of step K are formed of mineral wool.

\* \* \* \* \*